United States Patent [19]

Rowlett

[11] Patent Number: 5,697,308

[45] Date of Patent: Dec. 16, 1997

[54] SEED BOOT HAVING A WEAR RESISTANT INSERT

[75] Inventor: Don C. Rowlett, Bedford, Pa.

[73] Assignee: Kennametal Inc., Latrobe, Pa.

[21] Appl. No.: 575,657

[22] Filed: Dec. 20, 1995

[51] Int. Cl.$^6$ ................................................ A01C 5/00
[52] U.S. Cl. ..................... 111/149; 111/170; 172/701.3; 172/747
[58] Field of Search ..................... 111/152, 149, 111/153, 155, 157, 163, 170, 139; 172/701.3, 723, 699

[56] References Cited

U.S. PATENT DOCUMENTS

| | | | |
|---|---|---|---|
| 107,554 | 9/1870 | Slaughter. | |
| 712,564 | 11/1902 | Michael | 111/157 X |
| 1,124,695 | 1/1915 | Campbell | 111/157 |
| 1,167,662 | 1/1916 | Sessler | 111/163 |
| 1,299,160 | 4/1919 | Fetzer | 111/163 |
| 2,587,765 | 3/1952 | Rohrer | 172/723 |
| 2,917,012 | 12/1959 | Oehler et al. | 111/157 |
| 3,658,018 | 4/1972 | Connor | 111/88 |
| 3,882,594 | 5/1975 | Jackson et al. | 228/122 |
| 4,031,834 | 6/1977 | Klenke | 111/163 X |
| 4,231,306 | 11/1980 | Whitehead et al. | 111/86 |
| 4,344,374 | 8/1982 | Gangluff et al. | 111/2 |
| 4,356,780 | 11/1982 | Bauman | 111/85 |
| 4,373,456 | 2/1983 | Westerfield | 111/88 |
| 4,408,667 | 10/1983 | Jarvis | 172/722 |
| 4,423,788 | 1/1984 | Robinson, Jr. et al. | 172/427 |
| 4,580,507 | 4/1986 | Dreyer et al. | 111/73 |
| 4,715,450 | 12/1987 | Hallissy et al. | 172/701.3 |
| 4,736,803 | 4/1988 | Roush | 172/560 |
| 4,744,316 | 5/1988 | Lienemann et al. | 111/69 |
| 4,760,806 | 8/1988 | Bigbee et al. | 111/87 |
| 4,766,692 | 8/1988 | Frase | 172/624.5 |
| 4,955,297 | 9/1990 | Tsukamoto | 111/152 |
| 5,025,736 | 6/1991 | Anderson | 111/152 |
| 5,119,888 | 6/1992 | Hall | 172/699 |
| 5,129,168 | 7/1992 | Hedley | 37/141 |
| 5,131,725 | 7/1992 | Rowlett et al. | 299/79 |
| 5,159,985 | 11/1992 | Rowlett | 172/723 |
| 5,297,637 | 3/1994 | Rowlett | 172/604 |
| 5,310,009 | 5/1994 | Rowlett | 172/723 |
| 5,314,029 | 5/1994 | Rowlett | 172/699 |
| 5,325,799 | 7/1994 | Rowlett | 111/152 |
| 5,333,559 | 8/1994 | Hodapp et al. | 111/152 |
| 5,429,016 | 7/1995 | Rowlett | 76/115 |
| 5,429,199 | 7/1995 | Sheirer et al. | 175/321 |

FOREIGN PATENT DOCUMENTS

| | | |
|---|---|---|
| 3535211 A1 | 2/1987 | Germany. |
| WO82/40375 | 12/1982 | WIPO. |

*Primary Examiner*—Randolph A. Reese
*Assistant Examiner*—Victor Batson
*Attorney, Agent, or Firm*—John J. Prizzi

[57] ABSTRACT

A seed boot for use with a furrow forming disk of a grain drill for depositing seed within a furrow. The seed boot includes a housing having an inner side, an outer side and a furrow firming edge. The furrow firming edge extends between a lower edge of the inner side and a lower edge of the outer side. The furrow firming edge includes an opening positioned below an axis of the disk and in communication with an internal seed delivery tube that extends the length of the housing. At least one side wear insert is attached to the lower edge of the outer side of the seed boot to prevent side and down force wear of the seed boot.

10 Claims, 3 Drawing Sheets

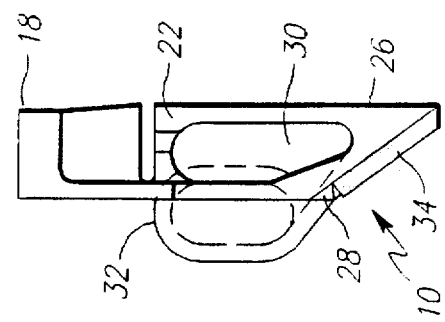
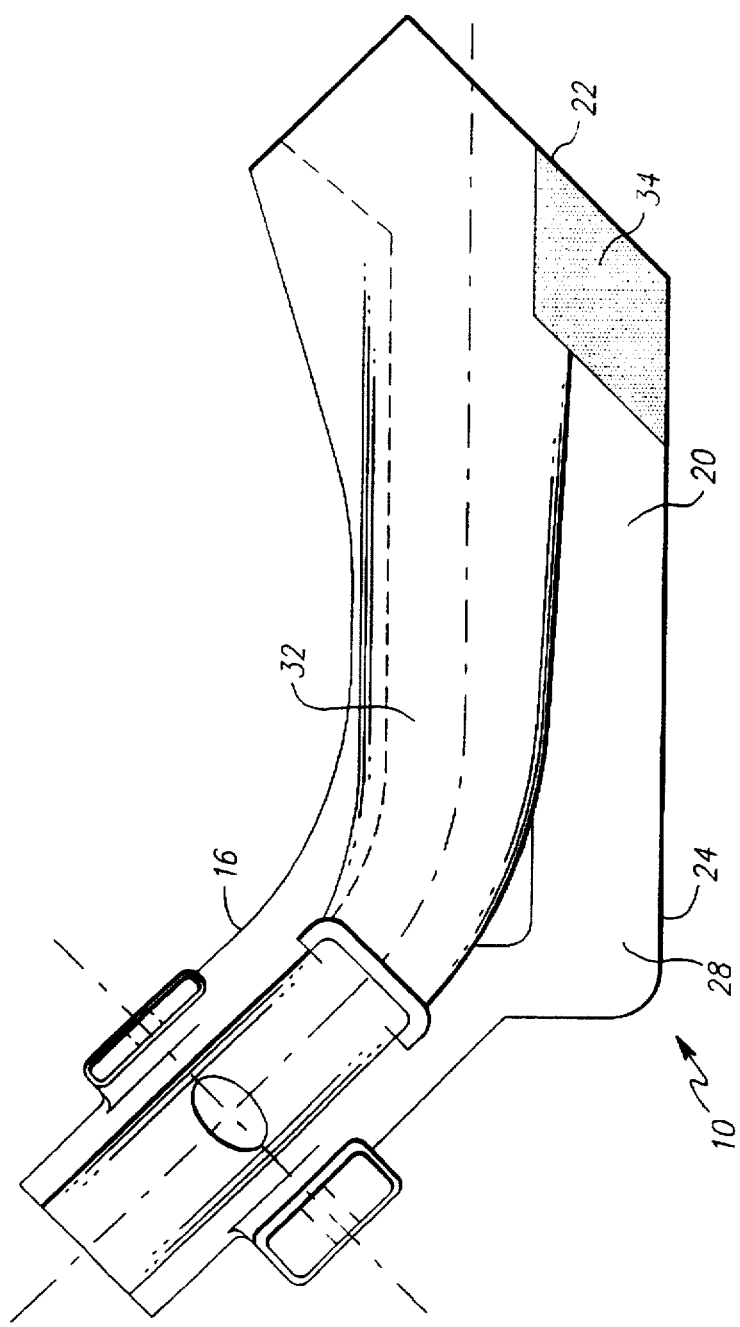

SEED BOOT HAVING A WEAR RESISTANT INSERT

FIELD OF THE INVENTION

This invention relates to a seed boot for use on a seed drill/planter. More particularly, this invention relates to a seed boot including one or more hard wear resistant inserts for depositing a seed within a furrow.

BACKGROUND OF THE INVENTION

The proper depositing of seeds into a v-shaped furrow formed in the soil requires special care in handling the seeds and in maintaining the sidewalls of the furrow to ensure that the seed is deposited within the v-shaped furrow at the proper seed planting depth. It will be appreciated that if a seed boot is in a worn condition, loose soil from the sidewalls of the v-shaped furrow may spill into the furrow before the seed is deposited or the seed may be blown or bounced around or out of the furrow, such that the seed is prevented from being deposited in the furrow or from reaching a proper seed planting depth. To achieve proper seed planting depth and preventing soil from collapsing in the furrow prior to depositing the seed a worn seed boot must be either continually adjusted for proper height with the bottom of the furrow or the seed boot must be replaced. Replacement of a worn seed boot results in lost planting time and reduced cost efficiency.

The present invention is concerned with a seed boot including one or more inserts which may be simply and effectively secured to a seed boot to protect the seed boot from wear and contribute to proper depositing of seeds.

SUMMARY OF THE INVENTION

Briefly according to this invention, there is provided a seed boot for use with a furrow forming disk of a seed planter such as a grain drill for depositing seed within a furrow. The disk is rotatable about a central axis for forming in cooperation with seed boot a v-shaped furrow. The seed boot includes a housing having an inner side, an outer side and a furrow firming edge. The furrow firming edge extends between a lower edge of the inner side and a lower edge of the outer side and includes an opening positioned below an axis of the disk and in communication with an internal seed delivery tube extending the length of the housing. At least one side wear insert is attached to the lower edge of the outer side of the seed boot to prevent side and down force wear of the seed boot.

The at least one side wear insert may extend along the lower edge of the outer side and, preferably across only a front portion of the lower edge. The at least one side wear insert is of a parallelogram shape.

The seed boot may include a furrow firming insert attached to the furrow firming edge and positioned forward of the opening. The furrow firming insert is of a generally elongated v-shape having a leading end, a trailing end, a top surface, a first side surface and a second opposing side surface coterminous therewith defining a longitudinally extending lower edge.

The at least one side wear insert and the furrow firming insert are of a hard wear resistant material, such as WC—Co.

BRIEF DESCRIPTION OF THE DRAWINGS

Further features and other advantages of this invention will become clear from the following detailed description made with reference to the drawings in which:

FIG. 2 is a side view of the seed boot of FIG. 1;

FIG. 3 is an end view of the seed boot of FIG. 2 illustrating the opening within the furrow firming edge;

DESCRIPTION OF THE PREFERRED EMBODIMENTS

Figure 1:
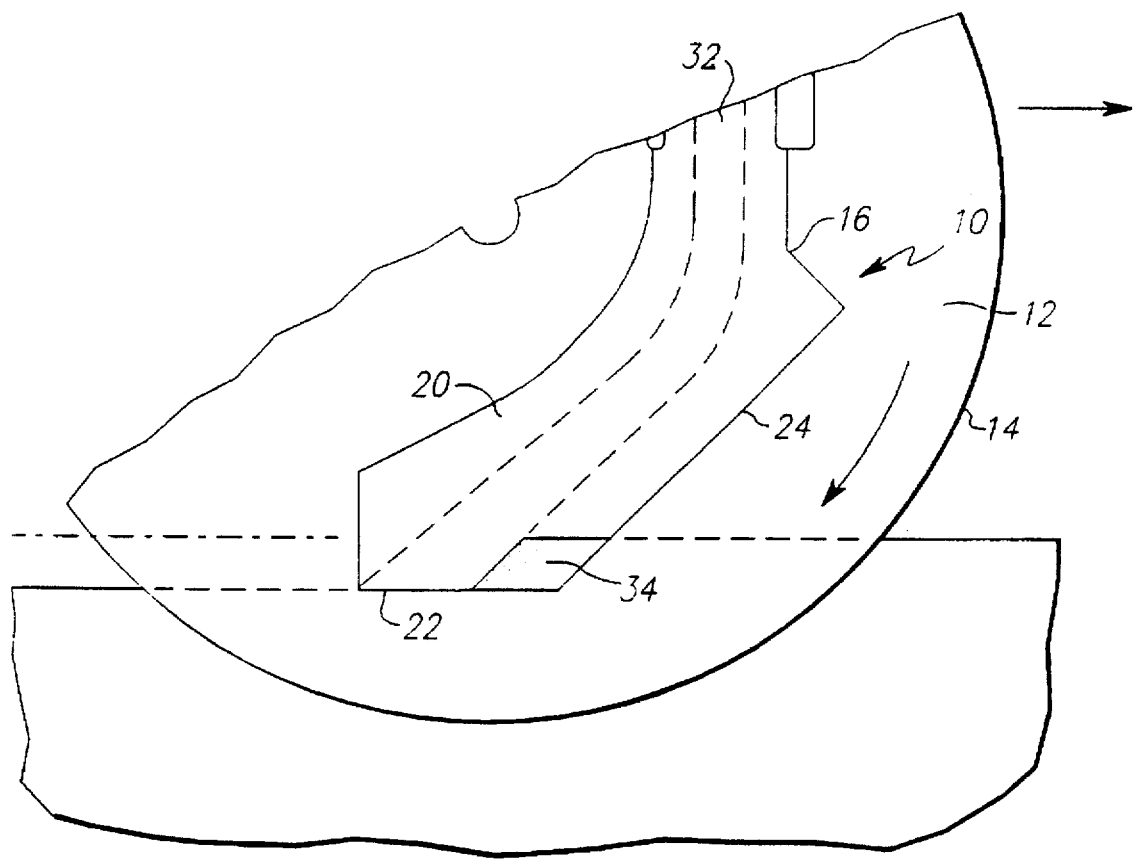
FIG. 1 is a partial fragmentary side view of a disc blade and seed boot in accordance with the present invention.
Figures 4, 5:
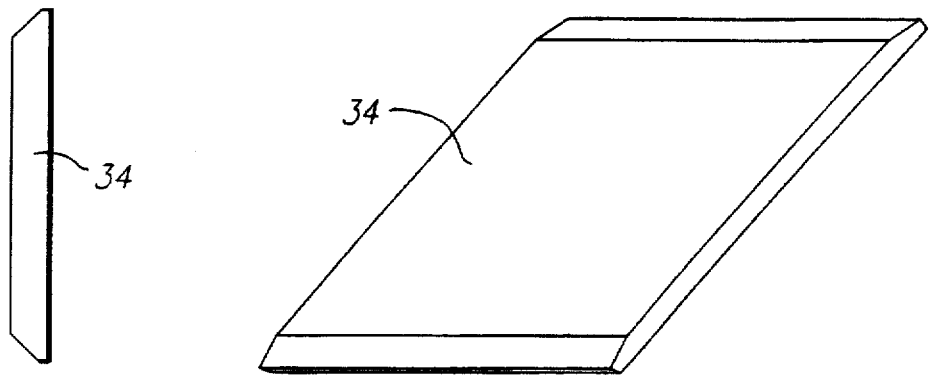
FIG. 4 is an end view of a side wear insert used on the seed boot of FIG. 2.
FIG. 5 is an isometric view of the side wear insert of FIG. 4.
Figure 6:
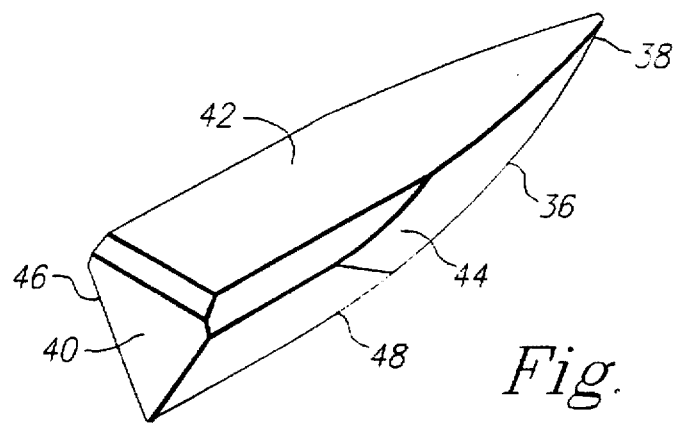
FIG. 6 is an isometric view of a furrow firming insert for use on the seed boot of FIG. 2.
Figure 7:
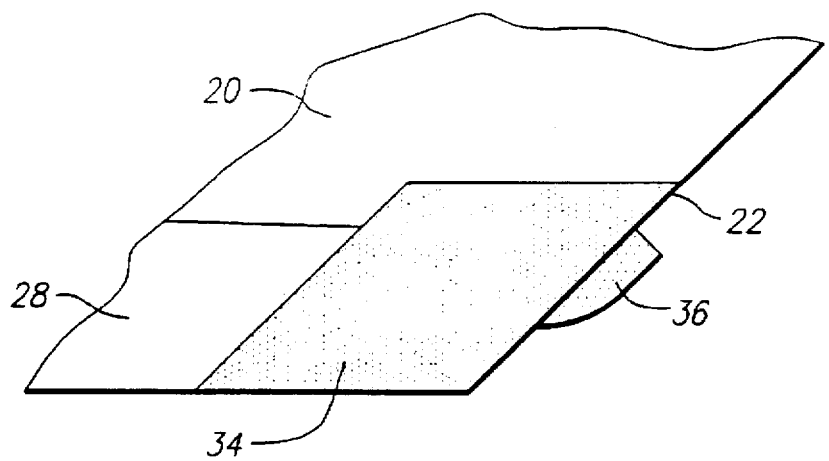
FIG. 7 is an enlarged partial fragmentary side view of the seed boot of FIG. 1 including a side wear insert and a furrow firming insert.
Figure 8:
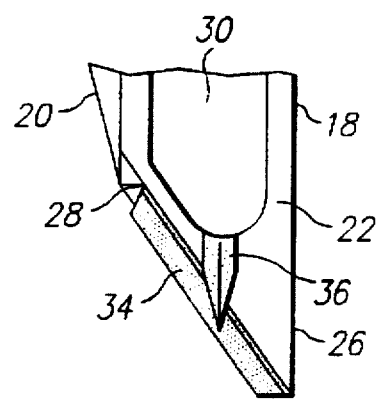
FIG. 8 is an enlarged partial fragmentary end view of the seed boot including the side wear insert and the furrow firming insert of FIG. 7.

In the following description like reference characters represent like or corresponding elements. Also, in the following description, it is to be understood that such terms as "forward," "rearward," "lower," and the like are words of convenience and are not to be construed as limiting terms.

Referring now to FIG. 1, there is shown a seed boot 10 for use with a seed planter such as a grain drill (not shown). The seed boot 10 is preferably a ductile iron casting and may be attached as well known in the art to a suitable planting machine such as a John Deere Model 750 Grain Drill. For a detailed discussion of the operation and design of a grain drill, reference is made to U.S. Pat. No. 4,760,806, incorporated herein by reference.

The seed boot 10 is used in cooperation with an adjacent rotating furrow forming disk 12 of the grain drill. The seed boot 10 is operatively connected forwardly of the axis of the rotating disk 12 and travels in the direction indicated as shown in FIG. 1. The seed boot 10 directs a seed (not shown) to the bottom of a v-shaped furrow formed by the disk 12 and prevents the movement of loose soil into the furrow until the seed has been deposited. The seed boot 10 may be positioned on either side of the disk 12 as desired. As shown in FIG. 1, the seed boot 10 is positioned on the left side of the disk 12 when facing the forward edge 14 of the disk. The seed boot 10 for the opposing side of the disk 12 is a mirror image of the seed boot shown in FIG. 1.

Briefly, referring to the figures, the seed boot 10 includes a downwardly and rearwardly angled housing 16 including an inner side 18 facing the disk surface, an outer side 20 facing away from the disk surface and a lower furrow firming edge 22. A forward facing edge of the inner side 18 and a forward facing edge of the outer side 20 of the seed boot 10 converge to a forward scraping edge 24. The forward scraping edge 24 is positioned adjacent the surface of the disk 12 to remove soil and trash from the disk as the disk rotates in the soil.

The inner side 18 of the seed boot 10 includes a generally planar rim surface 26 extending parallel with the surface of the disk 12. The outer side 20 of the seed boot 10 includes a peripheral lower surface 28 angled downwardly toward the surface of the disk 12. The perimeter of the lower surface 28 of the outer side 20 and planar rim surface 26 of the inner side 18 meet to form the forward scraping edge 24 previously described. The angled lower surface 28 of the seed boot 10 presents a stream-lined profile when the inner side 18 is positioned adjacent the surface of the disk 12.

The furrow firming edge 22 of the seed boot 10 extends horizontally between the lower edge of the inner side 18 and the lower edge of the outer side 20. The furrow firming edge 22 includes a rearwardly directed opening 30 positioned below the axis of the disk 12 and in communication with an internal seed delivery tube 32 which extends the length of the housing 16. The seed delivery tube 32 may be of most any suitable cross sectional shape, including rectangular, circular and the like.

In accordance with the present invention, to prevent side and down force wear of the seed boot 10, the seed boot includes one or more side wear inserts 34 attached to the lower edge of the outer side 20 of the seed boot. The inserts 34 may be of most any size and shape to extend along the furrow firming edge 22 from the forward scraping edge 24. In a preferred embodiment, the inserts 34 are of a parallelogram shape to follow the contour of the lower forward corner of the outer side 20 and extend only across a portion of the lower edge of the outer side 20 sufficient to protect the exposed lower edge of the housing 16. It will be appreciated that the shape of the parallelogram insert 34 allows the same insert to be used on a seed boot 10 of a type to be positioned on either side of the disk 12. The parallelogram insert 34 protects the lower outer side 20 of the seed boot 10 from the abrasive effects of the sliced soil.

Depending upon soil conditions and/or the type of seed to be planted, the seed boot 10 may include a furrow firming insert 36 attached to the furrow firming edge 22. Preferably, the furrow firming insert 36 is positioned forward of the opening 30 to prevent wear of the firming edge 22, prevent blockage of the opening, compact the adjacent sidewall of the furrow and provide a uniform depth to the furrow. It will be appreciated that a furrow firming insert 36 also provides a more defined, sharper v-shaped furrow than heretofore known seed boots.

The furrow firming insert 36 is of a generally elongated v-shape having a leading end 38, a trailing end 40, a top surface 42, a first side surface 44 and a second opposing side surface 46 coterminous therewith defining a longitudinally extending lower edge 48. The first and second side surfaces 44 and 46 diverge upwardly from the lower edge 48 to a peripheral edge of the top surface 42. The leading end 38 of the insert 36 is of a general v-shape to facilitate a slicing action of the seed boot 10 and protect the bond formed between the insert and the seed boot. Reference is made to U.S. Pat. No. 5,159,985, incorporated herein by reference, for a more detailed discussion of one type of furrow firming insert which may be used in accordance with the present invention.

In operation, seeds are dropped from a seed hopper into the seed delivery tube 32. The seed delivery tube 32 is rearwardly slanted to impart to the dropping seed a rearward component of velocity such that the seed will drop directly into the furrow with little relative velocity with respect to the ground. As the seed is deposited into the v-shaped furrow and settles to the bottom it is trapped and grasped by the v-shaped bottom of the furrow. As each seed is dropped and grasped, the seed settles rather than bounces. It will be appreciated that the furrow firming insert 36 and side wear inserts 34 protect the seed boot 10 and allow the seed boot to form a furrow of a uniform depth.

The furrow firming insert 36 and side wear inserts 34 may be comprised of a hard wear resistant material such as cemented tungsten carbide (WC—Co) or a mixture of tungsten carbide in a barberite matrix. Barberite may be obtained from Dycon International, Incorporated of Troutdale, Oreg. ("Barberite" is a nonferrous alloy containing approximately 88.5 wt % copper, 5 wt % nickel, 5 wt % tin, and 1.5 wt % silicon.) In a preferred embodiment, the inserts 34 and 36 are comprised of a cemented tungsten carbide containing cobalt as a binder, optionally with other refractory materials, such as cubic refractory transition metal carbides, as additives. In a preferred embodiment, the inserts 34 and 36 include at least 8 weight percent cobalt and no more than 20 weight percent cobalt.

The grain size of the tungsten carbide may vary from fine (e.g. about 1 micron) providing a harder insert to coarse (e.g. about 12 micron), providing a tougher insert, depending upon the operating environment, the carbide to binder ratio, and the degree of fracture toughness desired.

The side wear inserts 34 and furrow firming inserts 36 may be brazed to the seed boot 10 by using conventional brazing compositions and techniques known to one skilled in the art. It will be appreciated that the inserts 34 and 36 may also be welded or epoxied to the seed boot 10 using conventional techniques known to one skilled in the art.

The documents and patents referred to herein are hereby incorporated by reference.

Having described presently preferred embodiments of the invention it is to be understood that it may be otherwise embodied within the scope of the appended claims.

What is claimed is:

1. A seed boot comprising
   a housing including an inner side, an outer side and a furrow firming edge, the furrow firming edge extending between a lower edge of the inner side and a lower edge of the outer side;
   the furrow firming edge including an opening for depositing seed within a furrow and in communication with an internal seed delivery tube extending the length of the housing;
   a furrow firming insert attached to the furrow firming edge and positioned forward of the opening; and
   at least one side wear insert attached to the lower edge of the outer side of the seed boot to prevent side and down force wear of the seed boot.

2. The seed boot of claim 1 wherein the furrow firming insert is of a generally elongated v-shape having a leading end, a trailing end, a top surface, a first side surface and a second opposing side surface coterminous therewith defining a longitudinally extending lower edge.

3. The seed boot of claim 2 wherein the furrow firming insert is of a hard wear resistant material.

4. The seed boot of claim 3 wherein the furrow firming insert is made of WC—Co.

5. A seed boot for use with a furrow forming disk of a grain drill for depositing seed within a furrow, the seed boot comprising:
   a housing including an inner side, an outer side and a furrow firming edge, the furrow firming edge extending between a lower edge of the inner side and a lower edge of the outer side, a forward facing edge of the inner side and a forward facing edge of the outer side of the seed boot converge to a forward scraping edge;
   the lower furrow firming edge including an opening capable of being positioned below the axis of the disk and in communication with an internal seed delivery tube extending the length of the housing;
   a furrow firming insert attached to the furrow firming edge and positioned forward of the opening; and
   at least one side wear insert attached to and extending across a portion of the lower edge of the outer side of the seed boot to prevent side and down force wear of the seed boot.

6. The seed boot of claim 5 wherein the at least one side wear insert is of a parallelogram shape.

7. The seed boot of claim 5 wherein the furrow firming insert is of a generally elongated v-shape having a leading end, a trailing end, a top surface, a first side surface and a second opposing side surface coterminous therewith defining a longitudinally extending lower edge.

8. The combination of a seed boot and a disk of a grain drill for depositing seed within a furrow comprising:

a disk rotatable about a central axis for forming a v-shaped furrow;

a seed boot operatively connected forwardly of the central axis of the rotating disk and adjacent the disk, the seed boot including a housing having an inner side, an outer side and a furrow firming edge, the furrow firming edge extending between a lower edge of the inner side and a lower edge of the outer side;

the furrow firming edge including an opening positioned below an axis of the disk and in communication with an internal seed delivery tube extending the length of the housing;

a furrow firming insert attached to the furrow firming edge and positioned forward of the opening; and at least one side wear insert attached to the lower edge of the outer side of the seed boot to prevent side and down force wear of the seed boot.

9. The combination of claim 8 wherein the furrow firming insert is of a generally elongated v-shape having a leading end, a trailing end, a top surface, a first side surface and a second opposing side surface coterminous therewith defining a longitudinally extending lower edge.

10. The combination of claim 9 wherein the furrow firming insert is of a hard wear resistant material.

* * * * *